L. H. MORSE AND J. J. TRACY.
WINDSHIELD CLEANER.
Reissued July 20, 1920. 14,920.
APPLICATION FILED JUNE 15, 1920.
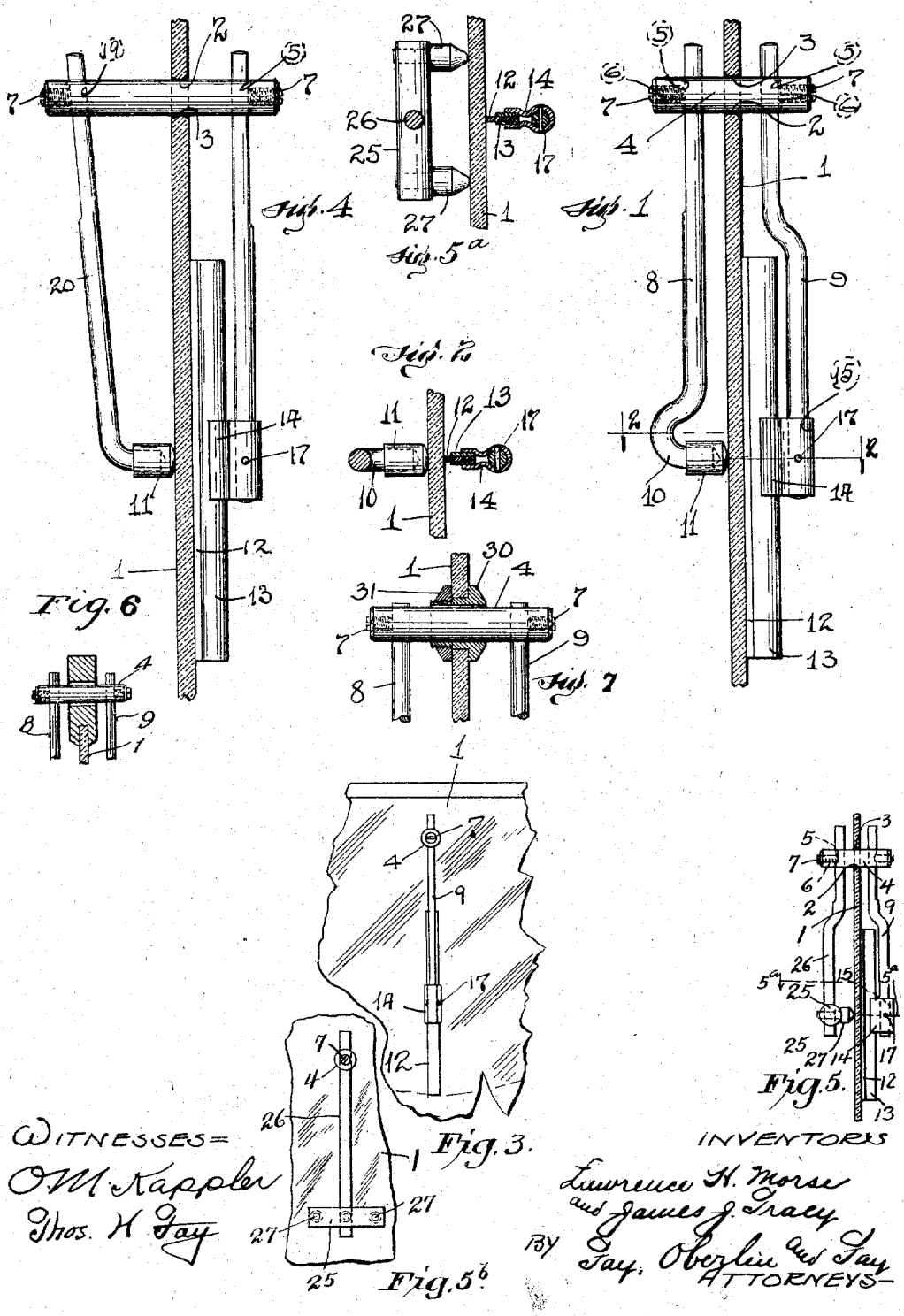
WITNESSES=
O. M. Kappler
Thos. H. Jay
INVENTORS
Lawrence H. Morse
and James J. Tracy
BY Jay, Oberlin and Jay
ATTORNEYS

UNITED STATES PATENT OFFICE.

LAWRENCE H. MORSE AND JAMES J. TRACY, OF CLEVELAND, OHIO; SAID MORSE ASSIGNOR TO SAID TRACY.

WINDSHIELD-CLEANER.

14,920. Specification of Reissued Letters Patent. Reissued July 20, 1920.

Original No. 1,339,216, dated May 4, 1920, Serial No. 66,154, filed December 10, 1915. Application for reissue filed June 15, 1920. Serial No. 389,483.

*To all whom it may concern:*

Be it known that we, LAWRENCE H. MORSE and JAMES J. TRACY, both citizens of the United States, and residents of Cleveland, county of Cuyahoga, and State of Ohio, have jointly invented a new and useful Improvement in Windshield-Cleaners, of which the following is a specification, the principle of the invention being herein explained and the best mode in which we have contemplated applying that principle, so as to distinguish it from other inventions.

The present invention relates to a windshield cleaner which may be readily attached to any windshield, and does not have to have a special mounting to fit the windshield frame. The device is also readily adjustable so that it will fit the windshield, regardless of the thickness of the frame or glass on which it will be mounted. A very simple and convenient method of attachment has been discovered, one suited to a variety of conditions, and the device is further adapted to automatically adjust itself to the shield so as to allow the cleaning element to aline itself to the glass at all times. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but several of various mechanical forms in which the principle of the invention may be used.

In said annexed drawing:—

Figure 1 is a vertical side elevation of our device in place on a windshield; Fig. 2 is a section on the line 2—2, Fig. 1; Fig. 3 is a front elevational view showing the device as attached to a windshield; Fig. 4 is a view similar to Fig. 1, but showing a modification in one detail of construction; Fig. 5 is a view similar to Fig. 1 but showing still a further modification in construction; Figs. $5^a$ and $5^b$ are views similar to Figs. 2 and 3, respectively, but showing the modified construction of Fig. 5; and Figs. 6 and 7 are other views corresponding with Fig. 1, but showing two further modifications.

Referring to the first form of construction illustrated in the drawings (Figs. 1, 2 and 3), the device is intended to be supported by the glass pane of the windshield, thus adapting it for attachment to the window of a coupé or in like situations where the sash, or frame of the shield, fits in a casing. In this case the windshield glass 1 has an aperture 2 therethrough, with edges 3 which are slightly rounded so that a spindle 4, rotatably mounted therein, may also have a slight oscillatory movement about an axis transverse to its own axis, as well as limited longitudinal movement in the bearing provided by such aperture.

This spindle 4 has two transverse holes 5, one in each end, and longitudinal threaded apertures 6 in which set screws 7 are threaded, in order to clamp arms 8 and 9 which are respectively adjustably mounted in such apertures. Such arms have flat faces as indicated, adapted to be contacted by the set screws 7 to maintain them in place in the spindle 4, and respectively lie on the inside and outside of the shield.

Of these arms, the one 8, which thus lies on the inside, has an inturned portion 10 at its lower end, and attached to the latter is a head or knob 11 made of fiber, or other material which will not be liable to injure the glass with which it contacts. This arm 8 is also adapted to be used as the handle for operating the device and will, as shown, be spaced from the glass.

The other, or outer, arm 9 will have an elongated cleaning element or wiper attached thereto in parallel relation, such wiper consisting of the usual strip 12 of rubber, or the like, clamped in a rebent metallic strip 13, which in turn is held in a mounting 14, formed with an aperture 15 adapted to rigidly receive the free end of said arm 9. This cleaning element will preferably be held in place on the arm by a pin or rivet 17.

The operation of the device just described should be easily seen, since, after mounting in place, all that is necessary to operate it is to swing the device about the axis of the spindle 4. The inner arm 8 serves very well as a handle, being spaced sufficiently from the glass to be easily taken hold of. One of the features of the device is the provision for slight transverse oscillatory, as well as longitudinal, movement of said spindle in the aperture 3. This spindle, in effect, provides a floating support for the cleaning element, since it, with the two arms, is free to swing in a plane at right angles to that of the shield about the movable bearing provided for the outer end of arm 8 by the contact point 11, and thus serves to maintain such cleaning element, throughout its length, in close contact with the glass, in contradistinction to the prevailing type of construction in which a fixed mounting is provided in which such spindle is journaled, making necessary more or less elaborate adjustments either in connection with such mounting or with the cleaning element. In the present device, however, we have found that by allowing room for the spindle thus to oscillate and shift slightly, the device will automatically adjust itself with the cleaning element in proper parallel relation to the glass, so that the rubber strip will closely contact with the glass for its entire length. This is of greatest importance, as it not only allows the rubber cleaner strip to aline itself properly, but also permits it to flop, as it tends to do, when the direction of swing is reversed.

The modification illustrated in Fig. 4, relates to the disposition of the inner arm 20, corresponding with arm 8 of the first described form. In this modification, in other words, the hole 19 in spindle 4 makes an acute angle with the axis of said spindle, so that the arm in question inclines toward, instead of being parallel with the glass pane 1 of the shield. It follows that by simply adjusting said arm in aperture 19, the fiber knob 11 may be brought closer, or else moved farther away from the juxtaposed edge of the cleaner 12, so as to leave more or less space between the same and thus accommodate the device to different thicknesses of glass. The adjustment just described may also be found of use in taking up wear, as the rubber strip of the cleaner is reduced in width by use.

The modification illustrated in Figs. 5, $5^a$ and $5^b$ relates to the inner contacting end of the arm 8, or 20, as the case may be. In such modified form, instead of a single knob 11, forming a single point of contact, with the glass pane, we provide, two such points spaced transversely of the axis of the arm. Thus a cross-arm 25 may be fitted, as shown, onto the end of the swinging arm 26, corresponding as indicated with arms 8 and 20 of the previously described structures, and two knobs 27 can then be attached to said cross-arm so as to bear on the surface of the glass one on each side of said arm 26. Said knobs 27, while corresponding with the knob or head 11, instead of being cupped to fit onto the end of the operating arm, have reduced shanks that fit into apertures in the cross-arm, as clearly shown in Fig. 5. The two points of contact, thus provided obviously occupy a similar spaced relation with respect to the axis of the arm 9, and thus with respect to the cleaner 12, the result being to prevent rocking of such cleaner about any axis transverse to that of spindle 4, except the one defined by a line passing through such contact points 27. In other words the cleaner is held squarely to its work.

Instead of mounting the spindle 4 in an aperture in the glass pane of the shield, it may of course be similarly mounted in an aperture in the frame of such shield, where such frame is wide enough, as illustrated in Fig. 6; or where mounted in the pane, a special bearing may, if desired, be provided for the spindle, such bearing, at the same time, forming a reinforcement for the aperture. Thus in Fig. 7, we show a bearing made up of a tubular member 30 and a nut 31 adapted to clamp said member against the glass.

As hereinbefore described, the device may be mounted on any windshield, either through the glass or the frame of said shield, or upon such frame, the place of mounting being but a matter of convenience. The simplicity of the construction will be readily apparent, and in mounting the device on a windshield, it will only be necessary to adjust the fiber head and the rubber strip to contact fairly tightly with the respective surfaces of the glass. This can easily be accomplished, especially in the modified form of Fig. 4, by adjusting the position of the inner or operating arm in the spindle.

Furthermore, so long as the capacity for automatic adjustment of the spindle is secured, it is indifferent how such spindle is supported, whether directly in an aperture in the pane, on top of the frame, or in a special bearing.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. A wind-shield cleaner, comprising a bearing fixed transversely of the shield, a spindle loosely held in such bearing; two transversely disposed arms rigidly attached one to each end of said spindle, so as to lie on opposite sides of such shield; and an elongated cleaning element attached to one of said arms so as to be held in approximately parallel relation therewith, the other arm being disposed to movably contact with such shield at a point approximately opposite the middle of said cleaning element, whereby said cleaning element is pressed against such shield, and said spindle being both longitudinally movable in the bearing in said shield and oscillatory in the plane of the device about an axis passing through such point of contact of said other arm with such shield, whereby the pressure of said cleaning element on the shield is at all times automatically maintained uniform throughout the length of said element.

2. A wind-shield cleaner, comprising a bearing fixed transversely of the shield, a spindle loosely held in such bearing; two transversely disposed arms rigidly attached one to each end of said spindle, so as to lie on opposite sides of such shield; and an elongated cleaning element rigidly attached to one of said arms in approximately parallel relation therewith, the other arm being disposed to movably contact with such shield at a point approximately opposite the middle of said cleaning element, whereby said cleaning element is pressed against such shield, and said spindle being both longitudinally movable in the bearing in said shield and oscillatory in the plane of the device about an axis passing through such point of contact of said other arm with such shield, whereby the pressure of said cleaning element on the shield is at all times automatically maintained uniform throughout the length of said element.

3. A wind-shield cleaner, comprising a bearing fixed transversely of the shield, a spindle loosely held in such bearing; two transversely disposed arms rigidly attached one to each end of said spindle, so as to lie on opposite sides of such shield; and an elongated cleaning element attached to one of said arms so as to be held in approximately parallel relation therewith, the other arm being formed and disposed to movably contact with such shield at two transversely spaced points approximately opposite the middle of said cleaning element, whereby said cleaning element is pressed against such shield, and said spindle being both longitudinally movable in the bearing in said shield and oscillatory in the plane of the device about an axis passing through such points, whereby the pressure of said cleaning element on the shield is at all times automatically maintained uniform throughout the length of said element.

4. A wind-shield cleaner, comprising a bearing fixed transversely of the shield, a spindle loosely held in such bearing; two transversely disposed arms rigidly attached one to each end of said spindle, so as to lie on opposite sides of such shield, one of said arms being inclined as well as transversely adjustable with respect to said spindle's axis; and an elongated cleaning element attached to one of said arms so as to be held in approximately parallel relation therewith, the other arm being disposed to movably contact with such shield at a point approximately opposite the middle of said cleaning element, whereby said cleaning element is pressed against such shield, and said spindle being both longitudinally movable in the bearing in said shield and oscillatory in the plane of the device about an axis passing through such point of contact of said other arm with such shield, whereby the pressure of said cleaning element on the shield is at all times automatically maintained uniform throughout the length of said element.

Signed by us this 7th day of December, 1915.

LAWRENCE H. MORSE.
JAMES J. TRACY.

Attested by—
MARY GLADWELL,
H. M. KATHE.